(12) United States Patent
Augustin et al.

(10) Patent No.: US 9,090,007 B2
(45) Date of Patent: Jul. 28, 2015

(54) COMPOSITE COMPONENT AND A METHOD AND DEVICE FOR PRODUCING THE COMPOSITE COMPONENT

(75) Inventors: Helmut Augustin, Hamburg (DE); Michael Bechtold, Moensheim (DE); Kai-Uwe Dudziak, Stelle (DE); Juergen Falke, Rellingen (DE); Dieter Junge, Gruenendeich (DE); Silke Langwaldt, Rosengarten (DE); Hans-Peter Maier, Nagold (DE); Hans Nottbusch, Hamburg (DE); Eckhard Reese, Apensen (DE); Matthias Schroeder, Gruenendeich (DE); Jens Schult, Stelle (DE)

(73) Assignee: Daimler AG, Stuttgart (DE)

( * ) Notice: Subject to any disclaimer, the term of this patent is extended or adjusted under 35 U.S.C. 154(b) by 1243 days.

(21) Appl. No.: 12/595,819

(22) PCT Filed: Apr. 4, 2008

(86) PCT No.: PCT/EP2008/002682
§ 371 (c)(1),
(2), (4) Date: Feb. 24, 2010

(87) PCT Pub. No.: WO2008/125232
PCT Pub. Date: Oct. 23, 2008

(65) Prior Publication Data
US 2010/0143618 A1    Jun. 10, 2010

(30) Foreign Application Priority Data

Apr. 13, 2007    (DE) .......................... 10 2007 017 415

(51) Int. Cl.
*B29C 45/14*    (2006.01)
*B29L 23/00*    (2006.01)

(52) U.S. Cl.
CPC ... *B29C 45/1418* (2013.01); *B29C 2045/14213* (2013.01); *B29L 2023/00* (2013.01); *Y10T 428/13* (2015.01); *Y10T 428/1355* (2015.01)

(58) Field of Classification Search
CPC ................. B29C 45/1418; B29C 2045/14213; Y10T 428/13; Y10T 428/1355; B29L 2023/00
USPC .................................. 428/35.8; 264/259, 510
See application file for complete search history.

(56) References Cited

U.S. PATENT DOCUMENTS 5,942,169 A    8/1999  Narazaki et al.
6,143,235 A   11/2000  Birkert
(Continued)

FOREIGN PATENT DOCUMENTS

DE    100 14 332 A1    10/2001
DE    100 14 332 C2     3/2002
(Continued)

OTHER PUBLICATIONS

Form PCT/ISA/220—Transmittal of International Search Report and Form PCT/ISA/210—International Search Report and translation of that portion of the report indicating the degree of relevance found by the foreign office) (12 pages total) dated Dec. 11, 2008.
(Continued)

*Primary Examiner* — Ellen S Wood
(74) *Attorney, Agent, or Firm* — Crowell & Moring LLP

(57) ABSTRACT

In a method and apparatus for producing a composite component comprising a hollow profile and at least one injection-molded element, a hollow profile (3) is formed by means of internal high pressure fluid forming and is encapsulated with an injection molding material to form the injection-molded element. The hollow profile is expanded by means of internal high pressure in a closed combination tool comprising an internal high pressure forming tool element and an injection molding tool element, before it is encapsulated. The hollow profile is pressed on the tool engraving only locally in the region of the location to be encapsulated, keeping the outlet of the injection molding channel opening into the tool engraving clear.

5 Claims, 3 Drawing Sheets

(56) References Cited

U.S. PATENT DOCUMENTS

| | | |
|---|---|---|
| 2003/0077409 A1 | 4/2003 | Schnell |
| 2003/0152745 A1 | 8/2003 | Wagenblast |
| 2004/0072006 A1 | 4/2004 | Staargaard et al. |
| 2005/0001354 A1 | 1/2005 | Klocke |
| 2008/0038576 A1 | 2/2008 | Riviere et al. |

FOREIGN PATENT DOCUMENTS

| | | |
|---|---|---|
| DE | 103 26 768 A1 | 1/2004 |
| EP | 0 894 548 A2 | 2/1999 |
| EP | 1 380 493 A2 | 1/2004 |
| EP | 1 380 493 A3 | 3/2004 |
| EP | 1 607 312 A1 | 12/2005 |
| EP | 1 749 639 A2 | 2/2007 |
| EP | 1 849 686 A1 | 10/2007 |
| EP | 1 749 639 A3 | 2/2008 |
| EP | 1 884 451 A1 | 2/2008 |
| GB | 2 350 312 A | 11/2000 |
| WO | WO 01/72495 A1 | 10/2001 |
| WO | WO 02/02292 A1 | 1/2002 |
| WO | WO 2005/002825 A1 | 1/2005 |
| WO | WO 2008/043432 A1 | 4/2008 |
| WO | WO 2008/067901 A1 | 6/2008 |

OTHER PUBLICATIONS

Form PCT/ISA/237—Written Opinion (9 pages).
German-language Office Action dated Jul. 30, 2014 (Five (5) pages).

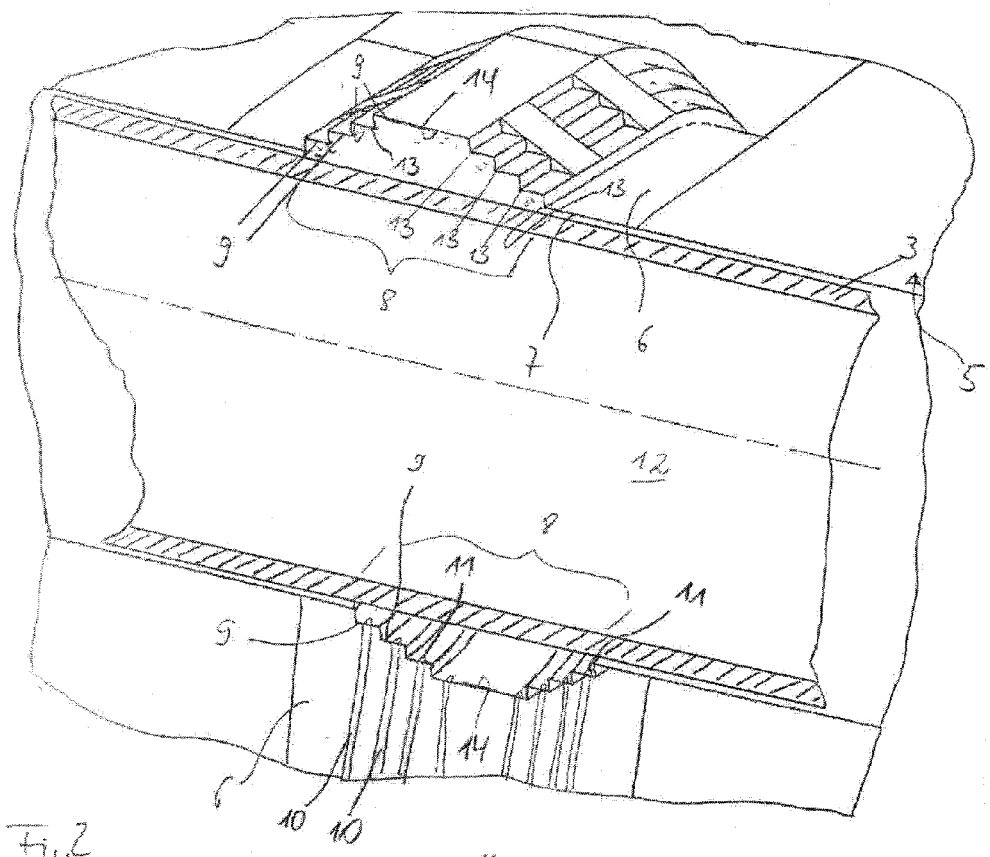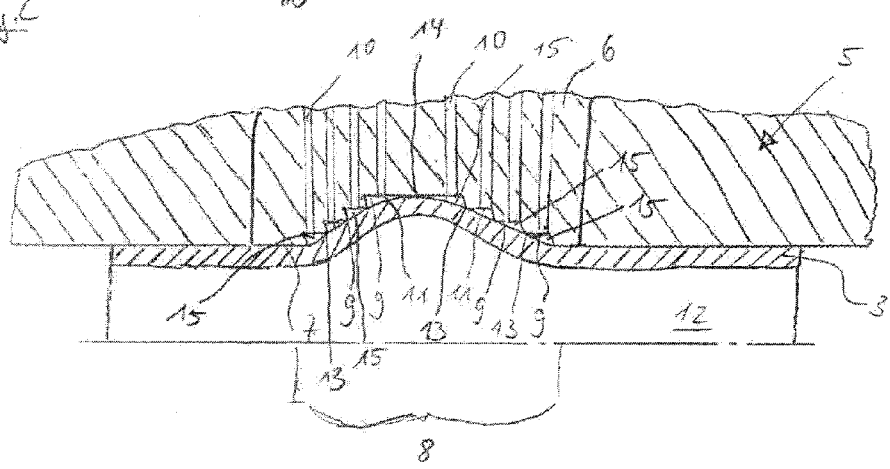

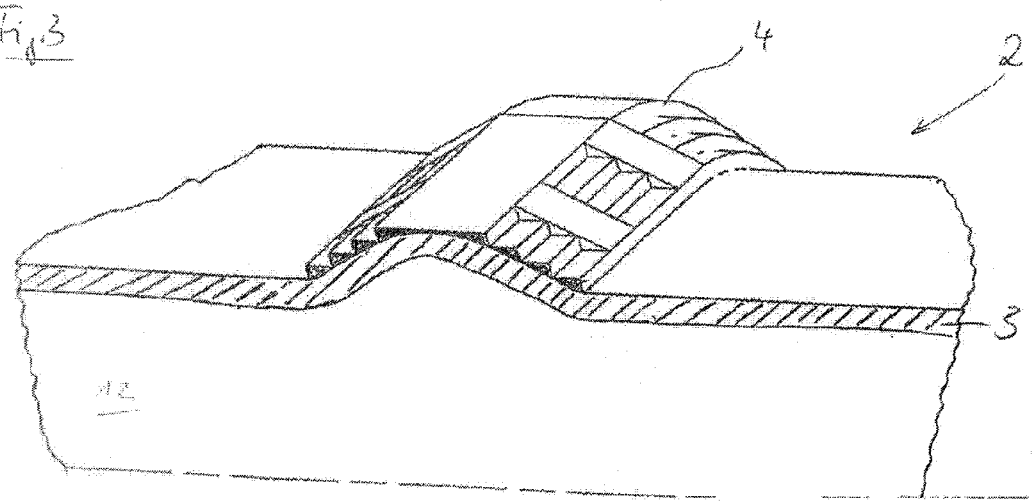
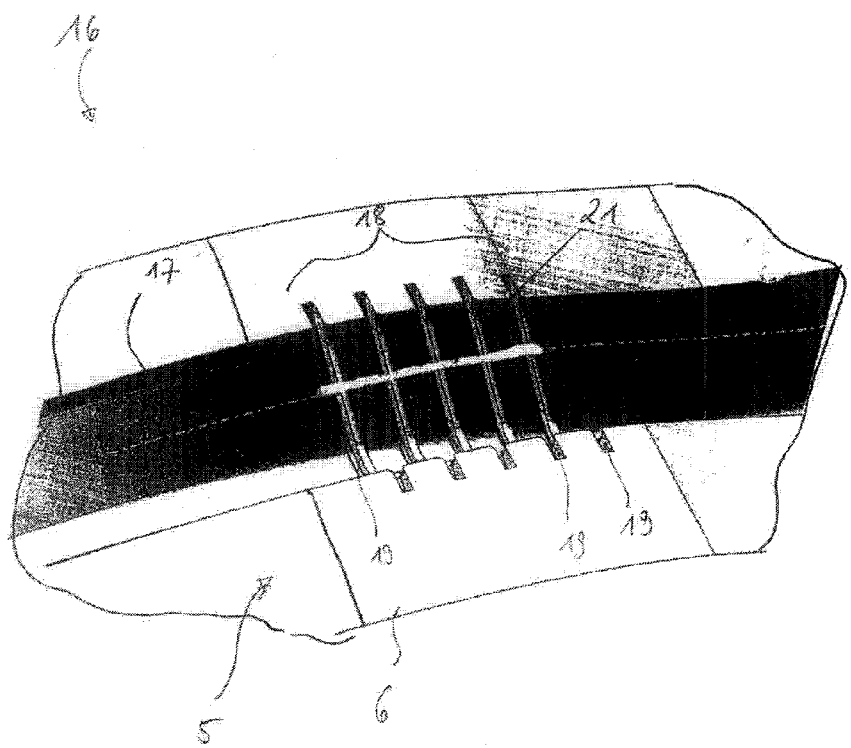

COMPOSITE COMPONENT AND A METHOD AND DEVICE FOR PRODUCING THE COMPOSITE COMPONENT

This application is a national stage of PCT International Application No. PCT/EP2008/002682, filed Apr. 4, 2008, which claims priority under 35 U.S.C. §119 to German Patent Application No. 10 2007 017 415.4, filed Apr. 13, 2007, the entire disclosure of which is herein expressly incorporated by reference.

BACKGROUND AND SUMMARY OF THE INVENTION

The invention relates to a method and apparatus for producing a composite component, and to a composite component produced according to the inventive method.

In a generic method and device, and an associated composite component, disclosed in German patent document DE 100 14 332 C2, a hollow profile is placed into a combination tool containing an internal high pressure forming tool element and an injection molding tool element, and is filled. Thereafter, the hollow profile is formed by the closing movement of the combination tool. Afterwards, an injection molding tool element is activated, in which the necessary cavities are generated by core and pusher movements. The completely formed hollow profile is now encapsulated corresponding to the form of the cavities, and an injection molding element is formed by the curing of the plastics. The composite component is then completed and can be removed from the combination tool after an opening lift.

Such a generation of the cavities by core pulls or pusher movements requires considerable effort, and tends to slow down the production. Moreover, if the pusher movements are carried out with the closed combination tool, only cavities with a very low complexity can be applied, so that the design possibilities of the injection molding element are limited considerably. If the cores are removed with an opened IHU tool, or if the pusher movements are carried out in this state, the production time is increased, which makes the production of the composite component uneconomic.

One object of the present invention is to provide method and apparatus of the type described above, which facilitates the production of a complexly formed composite component, in a simple manner.

This and other objects and advantages are achieved by the method and apparatus according to the invention, in which a hollow profile is widened in a closed combination tool that includes an internal high pressure forming tool element and an injection molding tool element, and is thereby suitable for internal high pressure formation and for local injection molding, by means of internal high pressure before the hollow profile is encapsulated. Additional process monitoring to assure that no hollow profile material enters the two mold parts (upper mold and lower mold or left and right tool half) can therefore be omitted, which reduces the required effort considerably. In addition, the danger of a process disruption is excluded, so that the process safety of the production of the composite component is ensured.

The principal problem of obstruction of the injection molding channels by hollow profile material as it is widened by internal high pressure (which increases if no cover of the injection molding cavities is present during the internal high pressure forming contrary to the known state of the art due to the technical and procedural simplification), is solved according to the invention, because the hollow profile is pressed against the tool contour or engraving only locally in the region of the locations to be encapsulated, while keeping the outlets opening into the tool engraving clear. Such partial abutment of the hollow profile is accomplished by a suitable geometry of the tool engraving of the combination tool, such that, with a forming pressure that is lower than the pressure with which the hollow profile would conform exactly to the contour of the engraving in the region of the parts to be encapsulated (that is, the "calibration pressure") only a partial abutment of the hollow profile is achieved at the engraving, as the geometry of the engraving does not permit a total abutment with the present forming pressure.

A free space is therefore created between the hollow profile and the engraving, into which injection molding material can be introduced subsequent to the forming with which the local or partial abutment of the hollow profile is achieved.

As the forming pressure is smaller, the localized abutment in question (and or the formation of the free space) can be achieved by a suitable choice of the radii, usually small radii, at the engraving in a simple manner. However, the radii must be designed so as to avoid cutting into the hollow profile due to the pressing at the engraving, which would cause the hollow profile to burst. This means that the edges at the engraving contour limiting the free space should be rounded.

Because the cavity or the free space for injection molding can be designed independently of the state of the art, a larger freedom of design is obtained with the formation of the injection molding elements to be generated. Therefore, more complicated and more complex structures can be achieved in a relatively simple manner during the formation of the composite component. As this is achieved simply by a suitable formation of the contour of the engraving, and no additional pusher movements or core pulls are necessary, the production process is unimpeded and faster.

It is also advantageous that the injection molding tool element and the IHU tool element comprise a common engraving with a widening region, whereby the hollow profile can remain in a single tool during the entire production process without being moved in any manner, thereby avoiding not only added production time, but also additional undesired manufacturing tolerances. Because the encapsulation further extends over the entire widening region or over the section of the hollow profile bulged by means of internal high pressure, a positive fit of the injection-molded element (cured later) with the hollow profile in the axial direction of the hollow profile is achieved, which gives the injection-molded element an undetachable hold on the hollow profile.

In a preferred further embodiment of the device according to the invention, the engraving comprises at least one step-like shoulder in the widening region, against whose edges the widened hollow profile abuts, and which limits the free space with the hollow profile. With the arrangement of shoulders opening into the individual injection molding channels, formings with a higher forming degree can be achieved with a plurality of versions by means of internal high pressure fluid forming without having to forego an encapsulation in this widening region. The hollow profile is bulged by the forming in the encapsulated region, while the injection molding element extends over the bulge region and is formed according to ascending and then descending steps.

In a further development of the invention, the engraving comprises at least one annular groove in the widening region which has a width of 8 mm at the most, and which forms the free space with the widened hollow profile abutting the engraving. The annular groove width thereby depends on the wall thickness and the material of the hollow profile used. In this manner, a composite component can be produced with minimum formation of the hollow profile, while nevertheless obtaining a sufficient axial hold of the injection molding element on the hollow profile by a positive fit. This is advantageous for the use of hollow profile materials which have a small breaking elongation.

The formation of annular grooves only represents a small engagement in the engraving, so that such grooves can be generated in a very simple manner. The groove width is chosen to be so narrow that, during the widening of the hollow profile, the hollow profile material can only prebulge into the grooves so that only small bulges result at the hollow profile, which however assume a rigid positive-fit connection with the injection molding element. Thus, the injection molding channels opening into the annular grooves are not obstructed or blocked by the hollow profile material.

The hollow profile abuts the engraving between the grooves, and thus locally, the grooves being spaced axially from one another in the extending widening region. With the formation of only one annular plant, the abutment of the hollow profile in the widening region is only limited to the edges limiting the groove.

According to a further embodiment of the invention, a composite component can be produced whose hollow profile is bulged in the encapsulated region only to a small extent by the forming and whose injection molding element extends over the bulging region and is formed in the shape of an annular lamella.

In a further preferred embodiment of the device according to the invention, the engraving comprises several annular grooves, whereby at least one groove is formed in the engraving, whose course intersects the course of the annular grooves. By this measure of the engraving design which can be carried out in a simple manner, the composite component can be produced, which comprises several lamella-shaped injection molding elements which are connected to each other by webs. Thus, the individual filigree injection molding elements have a higher stability and rigidity. These longitudinal nuts can proceed in a straight or curved manner, which results in a higher diversity of design possibilities of the webs.

Other objects, advantages and novel features of the present invention will become apparent from the following detailed description of the invention when considered in conjunction with the accompanying drawings.

BRIEF DESCRIPTION OF THE DRAWINGS

FIG. 1 shows the contour of an engraving in sections in a lateral longitudinal section of a device according to the invention with a step-shaped widening region, and an inserted hollow profile, before the forming;

FIG. 2 shows the engraving of FIG. 1 in sections in a longitudinal section, after the forming of the hollow profile;

FIG. 3 shows a longitudinal section of a composite component generated with the device from FIGS. 1 and 2;

FIG. 4 is a plan view of an engraving of a bottom mold of a device according to the invention with a bottom section with annular grooves arranged in an equidistant manner;

DETAILED DESCRIPTION OF THE DRAWINGS

Figure 5:
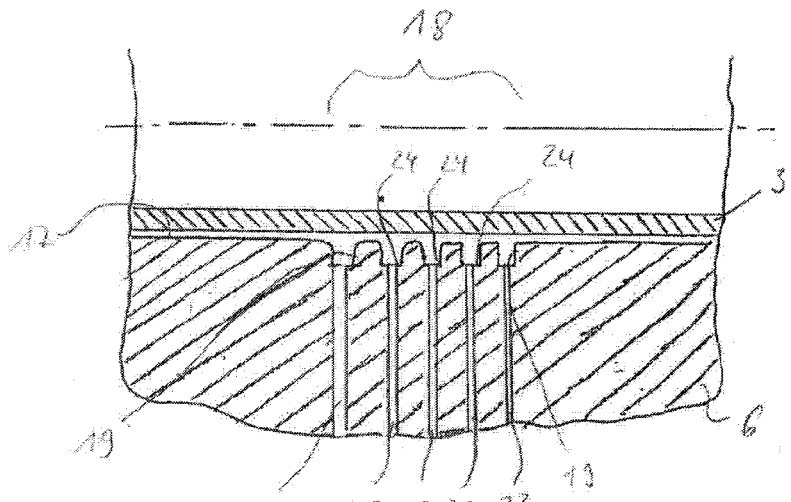
FIG. 5 shows the engraving of FIG. 4 in sections in a longitudinal section with an inserted hollow profile, before the forming.

FIG. 1 shows a device 1 for producing a composite component 2 (FIG. 3) comprising a hollow profile 3 and an injection molded element 4. The device 1 includes an IHU tool element 5 with an injection molding tool 6 integrated therein. The two tool elements 5 and 6 comprise a common engraved portion or engraving 7 with a widening region 8 formed by a recess; the engraving 7 has several stepped shoulders 9, which together form the shape of ascending and then descending steps. The injection molding tool 6 contains several injection molding channels 10, which respectively open into an outlet 11 of the shoulder surfaces.

According to FIG. 1, the hollow profile 3 is placed into the engraving 7 of the device 1 formed by the tool elements 5 and 6 according to the method according to the invention. Subsequently, the device 1 is closed and the hollow profile 3 is sealed at the ends in a high pressure sealing manner by two axial dies (not shown). Via an axial channel in at least one of these axial dies, a pressurized fluid is introduced into the interior 12 of the hollow profile and is tensioned by a fluid high pressure generating plant (not shown) connected to the axial channel, until a forming pressure is achieved which is smaller than the calibration pressure.

The hollow profile 3 then widens under the internal high pressure, into the widening region 8, forming a bulge, as shown in FIG. 2, with the hollow profile 3 locally abutting the edges 13 of the shoulders 9 surrounding the hollow profile 3 and the plateau 14 of the lower shoulder. The forming is completed in this manner.

The widened hollow profile 3, together with the shoulders 9, limits free spaces 15 in this state, so that the outlets 11 of the injection molding channels 10 opening into the tool engraving 7 are kept clear. The free spaces 15 thereby define the region of the locations of the hollow profile 3 which are to be encapsulated. Subsequently, the internal high pressure is for example lowered to a pressure which is smaller than a forming pressure, but is large enough that the hollow profile withstands the injection molding pressure of the following injection-molding process without damage with regard to stability and contour accuracy.

Injection molding material is now introduced into the free spaces 15 via the channels 10, whereby free spaces 15 are filled. After solidification of the injection molding material while forming the injection-molded element 4 comprising the bulging hollow profile 3 and extending over the bulging region (which is then formed mirror-inverted to the contour of the engraving 7), the internal high pressure is relaxed and the pressurized fluid is guided from the completed composite component 2. The axial dies are retracted from the sealing position, so that the device 1 can be opened, and the composite component 2 can be removed therefrom.

A hollow profile 3 displays a modification, which carries a dent or taper instead of a bulge. This tapering is generated by a bulging of the engraving of the combination tool in the closing process, which can be formed surrounding the engraving or only radially locally. The bulge of the engraving is designed in such a contoured manner that it corresponds to the form-negative image of the engraving 7 of the previous embodiment. After the mechanical bulging of the hollow profile, it is widened there by means of internal high pressure, until the hollow profile abuts the edges of the step-like section of the engraving. The injection molding channels are incidentally arranged in a similar manner as in the above embodiment, wherein the method principle for the formation of the composite component apart from the bulge—is in agreement. After the injection molding, the generated injection-molded element extends over the tapering region and is perceived in the form of descending and then ascending steps In a further version of the invention according to FIGS. 4-7, the device 16 according to the invention has an engraving 17, which comprises several annular grooves 19 in the widening region 18, whose width is 8 mm at the most, preferably 3 mm, and which respectively form the free space 20 with the widened hollow profile 3 abutting the engraving 17. In the engraving 17 is formed an at least longitudinally extending connection groove 21, whose course intersects the one of the annular grooves 19 (FIG. 4). The unformed hollow profile 3 is placed into the engraving 17 to produce the composite component 22, whereafter the device 16 closes and the hollow profile 3 is sealed by the above-mentioned dies (FIG. 5).

Figure 6:
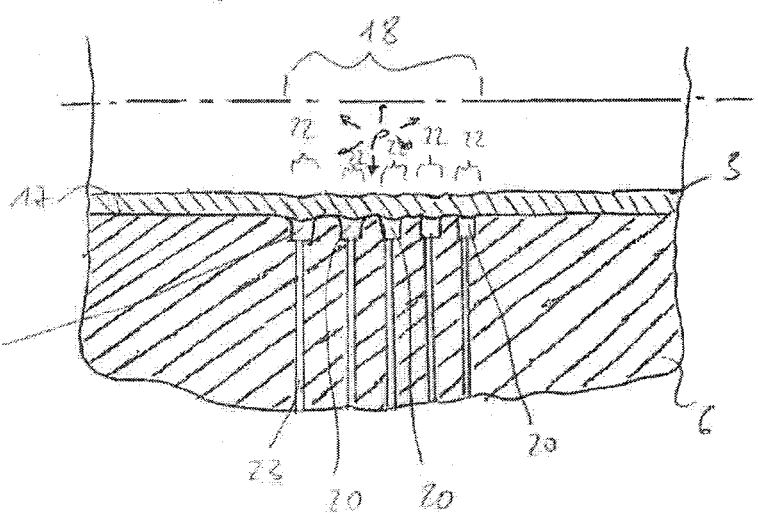
FIG. 6 shows the engraving of FIGS. 4 and 5 in sections in a lateral longitudinal section, after shows forming of the hollow profile.
Figure 7:
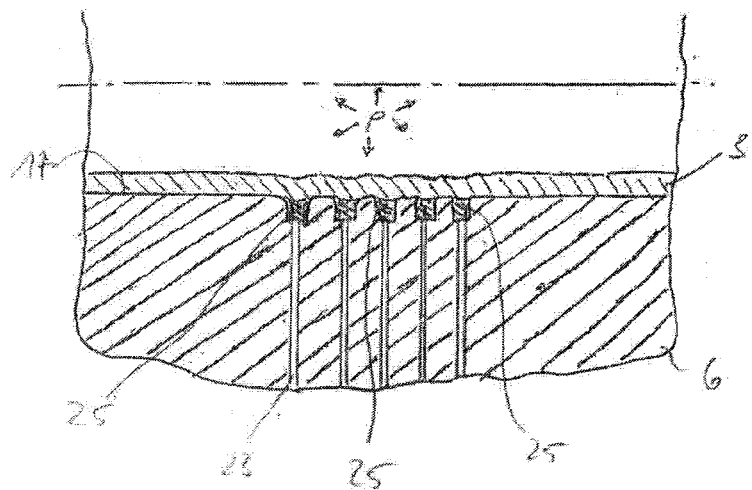
FIG. 7 shows the engraving of FIGS. 4-6 in sections, in a longitudinal section, during the injection molding process.

A fluid internal high pressure p is then generated after introducing the pressurized fluid and its tension, which widens the hollow profile 3 and bulges into the annular grooves 19 and into the groove 21 to a small extent. The hollow profile 3 locally abuts the annular grooves 19 and therewith the respective bulging region 22 between the annular nuts 19 locally at the engraving (FIG. 6).

Finally, analogous to the previous embodiment, the pressure in the hollow profile 3 is adjusted to a back pressure (for example lowered), and subsequently injection molding material is introduced into the respective free space 20 via injection molding channels 23 opening at the respective groove base of the annular grooves 19 and the connection groove 21, which distributes evenly around the hollow profile 3 with regard to the annular grooves 19.

Injection-molded elements 25 result during the solidification of the injection molding material, which are formed in the shape of annular lamellae. The lamellae are connected to one another in one piece by a web corresponding to the injection-molded material solidified in the groove 21. It is feasible by all means that several connection grooves are placed in the engraving 17, which should proceed in such a manner that the composite component can be removed from the engraving 17 after the formation of the webs. These can for example proceed in the interstice of the IHU tool. The completed composite component can be removed from the device 16 after relaxing the pressure, retracting the axial dies and opening it.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A composite component comprising a hollow profile formed by internal high pressure and at least one injection-molded element injected thereon; wherein:

the hollow profile is bulged by forming in an encapsulated region and is formed with a plurality of bulges;

the injection-molded element extends over the encapsulated region and is formed in the shape of an annular lamella that includes a separate lamellae formed on top of each of the plurality of bulges and connected to each other by a web; and the plurality of bulges and the plurality of lamellae on top of the bulges are laterally aligned and parallel to each other.

2. A composite component formed of a hollow profile by means of internal high pressure and at least one injection-molded element injected thereon; wherein:

the hollow profile is widened in an encapsulated region by forming in the shape of a bulge;

the injection-molded element extends over the encapsulated region, and is formed in the shape of a plurality of ascending steps and a plurality of descending steps;

an upper-most one of the plurality of ascending steps adjoins a first side of a plateau region of the bulge;

an upper-most one of the plurality of descending steps adjoins a second side of the plateau region of the bulge, the first and second sides of the plateau region of the bulge being opposing sides.

3. The composite component according to claim 2, wherein a first non-stepped surface intersects the plurality of ascending steps in an ascending direction and a second non-stepped surface intersects the plurality of descending steps in a descending direction.

4. The composite component according to claim 2, wherein the plurality of ascending steps are arranged one after another in an ascending direction and the plurality of descending steps are arranged one after another in a descending direction.

5. A composite component formed of a hollow profile by means of internal high pressure and at least one injection-molded element injected thereto; and wherein:

the hollow profile comprises a taper in an encapsulated region;

the injection molding element extends over the tapering region and is formed in the shape of a plurality of ascending steps arranged one after another in an ascending direction and a plurality of descending steps arranged one after another in a descending direction;

a lower-most one of the plurality of ascending steps adjoins a first side of the tapering region; and a lower-most one of the plurality of descending steps adjoins a second side of the tapering region, the first and second side of the tapering region being opposite sides.

* * * * *